(12) United States Patent
Higinbotham et al.

(10) Patent No.: US 11,346,400 B2
(45) Date of Patent: May 31, 2022

(54) RESCUE BEARING

(71) Applicants: Ronald Higinbotham, Peabody, MA (US); Thomas Higinbotham, Peabody, MA (US)

(72) Inventors: Ronald Higinbotham, Peabody, MA (US); Thomas Higinbotham, Peabody, MA (US)

( * ) Notice: Subject to any disclaimer, the term of this patent is extended or adjusted under 35 U.S.C. 154(b) by 0 days.

(21) Appl. No.: 16/952,950

(22) Filed: Nov. 19, 2020

(65) Prior Publication Data
US 2021/0231176 A1 Jul. 29, 2021

Related U.S. Application Data

(60) Provisional application No. 62/965,480, filed on Jan. 24, 2020.

(51) Int. Cl.
*F16C 35/063* (2006.01)
*F16C 19/06* (2006.01)

(52) U.S. Cl.
CPC ............ *F16C 35/063* (2013.01); *F16C 19/06* (2013.01); *F16C 2237/00* (2013.01)

(58) Field of Classification Search
CPC .......... F16C 19/04; F16C 19/08; F16C 19/24; F16C 19/26; F16C 19/28; F16C 35/047; F16C 35/06; F16C 35/063; F16C 2237/00
See application file for complete search history.

(56) References Cited

U.S. PATENT DOCUMENTS

| | | | | |
|---|---|---|---|---|
| 2,419,691 A | * | 4/1947 | Shafer | F16C 35/063 403/42 |
| 3,276,828 A | * | 10/1966 | Mansfield | F16C 35/063 384/585 |
| 4,472,005 A | * | 9/1984 | Norton, II | F16C 35/063 384/495 |

* cited by examiner

*Primary Examiner* — James Pilkington

(57) ABSTRACT

Disclosed herein is a rescue bearing, in accordance with some embodiments. Accordingly, the rescue bearing comprises an outer ring, an inner ring, rolling elements, and fastening elements. Further, the inner ring comprises a middle portion and opposing side portions. Further, a first side portion of the opposing side portions extends axially from a first side end of the middle portion beyond a first outer ring edge of the outer ring. Further, a second side portion of the opposing side portions extends axially from a second side end of the middle portion beyond a second outer ring edge of the outer ring. Further, the inner ring is configured for receiving a shaft into a bore of the inner ring based on inserting the shaft into the bore. Further, the opposing side portions is configured to be fastened to the shaft using the fastening elements.

4 Claims, 8 Drawing Sheets

RESCUE BEARING

The current application claims a priority to the U.S. Provisional Patent application Ser. No. 62/965,480 filed on Jan. 24, 2020.

FIELD OF THE INVENTION

Generally, the present disclosure relates to the field of bearings. More specifically, the present disclosure relates to a rescue bearing.

BACKGROUND OF THE INVENTION

Bearings may fail untimely or unexpectedly causing damage to components such as shafts. Also, the untimely and unexpected bearing failures may require more time and resources repairing or replacing the bearing or the shafts. Further, the repairs done for the bearing failure problem do not provide an expedite solution when time is of the essence. A sleeve could be used over the shaft for the repairs but the bearings would need to be machined to size to accommodate the shaft with the sleeve.

Existing bearings are deficient with regard to several aspects. For instance, current bearings are not mountable on shafts having shaft damages. Further, the shaft damages on the shafts are caused by bearing failures. Furthermore, current bearings are not easily mountable on the shafts. Moreover, current bearings are removably mountable on the shafts.

Therefore, there is a need for a rescue bearing that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a rescue bearing, in accordance with some embodiments. Accordingly, the rescue bearing may include an outer ring, an inner ring, a plurality of rolling elements, and a pair of fastening elements. Further, the outer ring may include an outer peripheral surface, an inner peripheral surface, and a pair of opposing outer ring edges defined by the outer peripheral surface and the inner peripheral surface. Further, the outer ring may include a hole defined by the inner peripheral surface. Further, the inner ring may include a middle portion and a pair of opposing side portions. Further, the middle portion may be concentrically disposed within the hole. Further, the inner peripheral surface of the outer ring opposes an outer peripheral surface of the middle portion. Further, a first side portion of the pair of opposing side portions extends axially from a first side end of the middle portion beyond a first outer ring edge of the pair of opposing outer ring edges. Further, a second side portion of the pair of opposing side portions extends axially from a second side end of the middle portion beyond a second outer ring edge of the pair of opposing outer ring edges. Further, the first side end opposes the second side end. Further, the inner ring may include an inner peripheral surface and a bore defined by the inner peripheral surface. Further, the inner ring may be configured for receiving at least one shaft into the bore based on inserting the at least one shaft into the bore. Further, the plurality of rolling elements may be rollably disposed between the inner ring and the outer ring. Further, the inner ring may be configured to rotate relative to the outer ring using the plurality of rolling elements. Further, the pair of fastening elements may be coupled with the pair of opposing side portions. Further, the pair of opposing side portions may be configured to be fastened to the at least one shaft using the pair of fastening elements based on the receiving of the at least one shaft for securing the inner ring to the at least one shaft.

Further disclosed herein is a rescue bearing, in accordance with some embodiments. Accordingly, the rescue bearing may include an outer ring, an inner ring, a plurality of rolling elements, a pair of fastening elements, and at least one surface profile detecting element. Further, the outer ring may include an outer peripheral surface, an inner peripheral surface, and a pair of opposing outer ring edges defined by the outer peripheral surface and the inner peripheral surface. Further, the outer ring may include a hole defined by the inner peripheral surface. Further, the inner ring may include a middle portion and a pair of opposing side portions. Further, the middle portion may be concentrically disposed within the hole. Further, the inner peripheral surface of the outer ring opposes an outer peripheral surface of the middle portion. Further, a first side portion of the pair of opposing side portions extends axially from a first side end of the middle portion beyond a first outer ring edge of the pair of opposing outer ring edges. Further, a second side portion of the pair of opposing side portions extends axially from a second side end of the middle portion beyond a second outer ring edge of the pair of opposing outer ring edges. Further, the first side end opposes the second side end. Further, the inner ring may include an inner peripheral surface and a bore defined by the inner peripheral surface. Further, the inner ring may be configured for receiving at least one shaft into the bore based on inserting the at least one shaft into the bore. Further, the plurality of rolling elements may be rollably disposed between the inner ring and the outer ring. Further, the inner ring may be configured to rotate relative to the outer ring using the plurality of rolling elements. Further, the pair of fastening elements may be coupled with the pair of opposing side portions. Further, the pair of opposing side portions may be configured to be fastened to the at least one shaft using the pair of fastening elements based on the receiving of the at least one shaft for securing the inner ring to the at least one shaft. Further, the middle portion overlaps a primary portion of the at least one shaft and the pair of opposing side portions overlaps a pair of secondary portions of the at least one shaft based on the receiving. Further, the pair of opposing side portions may be configured to be fastened to the pair of secondary portions of the at least one shaft using the pair of fastening elements based on the receiving of the at least one shaft. Further, the at least one surface profile detecting element may be coupled with the inner ring. Further, the at least one surface profile detecting element may be configured for detecting at least one surface profile of the at least one shaft based on the inserting of the at least one shaft. Further, the primary portion may be associated with a first surface profile of the at least one surface profile and the pair of secondary portions may be associated with a second surface profile of the at least one surface profile. Further, the first surface profile may be dissimilar from the second surface profile. Further, the middle portion may be alignable with the primary portion and the pair of opposing side portions may be alignable with the pair of secondary portions based on the inserting of the at least one shaft and the detecting of the at least one surface profile.

Further disclosed herein is a rescue bearing, in accordance with some embodiments. Accordingly, the rescue bearing may include an outer ring, an inner ring, a plurality of rolling elements, a pair of locking set screws, and a pair of concentric locking collars. Further, the outer ring may include an outer peripheral surface, an inner peripheral surface, and a pair of opposing outer ring edges defined by the outer peripheral surface and the inner peripheral surface. Further, the outer ring may include a hole defined by the inner peripheral surface. Further, the inner ring may include a middle portion and a pair of opposing side portions. Further, the middle portion may be concentrically disposed within the hole. Further, the inner peripheral surface of the outer ring opposes an outer peripheral surface of the middle portion. Further, a first side portion of the pair of opposing side portions extends axially from a first side end of the middle portion beyond a first outer ring edge of the pair of opposing outer ring edges. Further, a second side portion of the pair of opposing side portions extends axially from a second side end of the middle portion beyond a second outer ring edge of the pair of opposing outer ring edges. Further, the first side end opposes the second side end. Further, the inner ring may include an inner peripheral surface and a bore defined by the inner peripheral surface. Further, the inner ring may be configured for receiving at least one shaft into the bore based on inserting the at least one shaft into the bore. Further, the plurality of rolling elements may be rollably disposed between the inner ring and the outer ring. Further, the inner ring may be configured to rotate relative to the outer ring using the plurality of rolling elements. Further, the pair of locking set screws may be coupled with the pair of opposing side portions. Further, a locking set screw of the pair of locking set screws may be threadedly coupled with an internally threaded opening comprised in each of the first side portion and the second side portion. Further, the locking set screw may be configured for transitioning between a first position and a second position based on at least one action receivable by the locking set screw. Further, the pair of opposing side portions detachably fastens to the at least one shaft based on the transitioning of the pair of locking set screws between the first position and the second position. Further, the pair of concentric locking collars may be coupled with the pair of opposing side portions. Further, a concentric locking collar of the pair of concentric locking collars may be disposed around an engageable portion comprised in the each of the first side portion and the second side portion. Further, the concentric locking collar may be configured for transitioning between a locked state and an unlocked state based on at least one action receivable by the concentric locking collar. Further, the pair of opposing side portions detachably fastens to the at least one shaft based on the transitioning of the pair of concentric locking collars between the locked state and the unlocked state.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
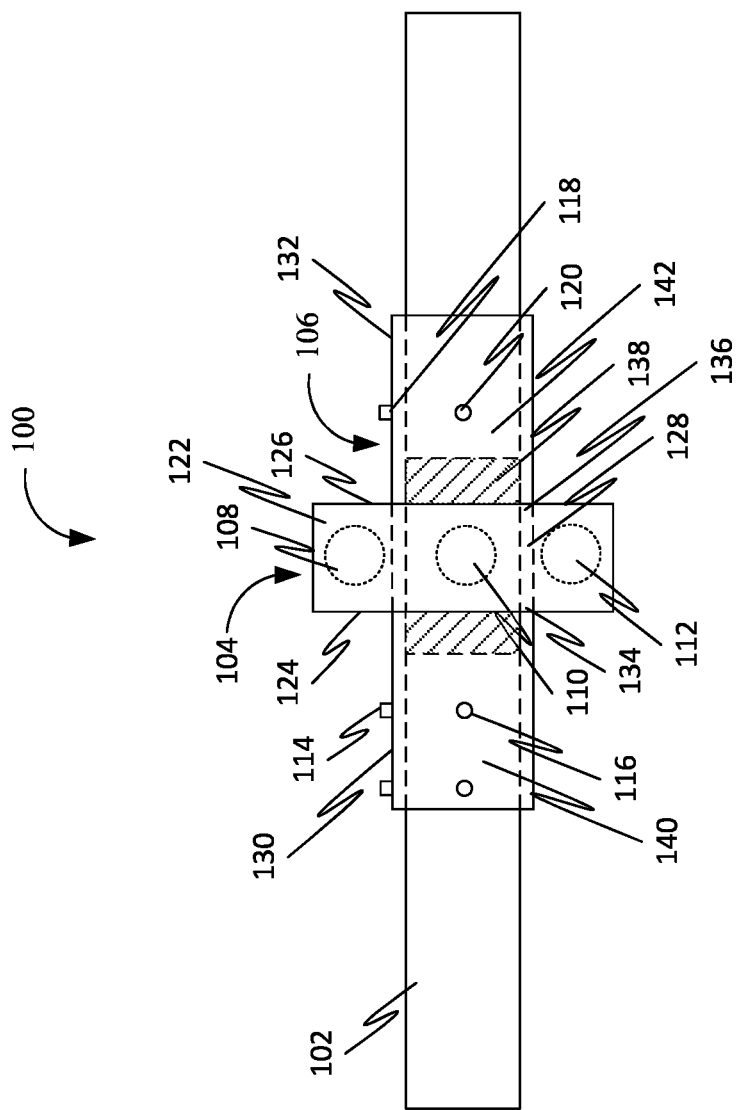
FIG. 1 is a front view of a rescue bearing mounted on at least one shaft, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a rescue bearing, embodiments of the present disclosure are not limited to use only in this context.

Overview:

The present disclosure describes a rescue bearing. Further, the rescue bearing is mountable on a shaft having shaft damages. Further, the shaft damages are caused by bearing failures. Further, the rescue bearing extends beyond the damaged area of the shaft allowing for an emergency repair until a permanent repair or replacement of the shaft can be effected. Further, the rescue bearing is a realistic modification of a common item used in the mechanical field. Further, the usage of the rescue bearing on the damaged shaft may decrease the time for repair and allow more time to schedule full repair during off-hours. Further, the rescue bearing may be manufactured by redesigning the existing bearing that is currently manufactured. Further, the redesigning may include installing an oversized inner race that exceeds the damaged area on the shaft. Further, the rescue bearing may include a standard bearing comprising a modified internal race that is sized to the damaged area on the shaft. Further, the rescue bearing similar to the existing bearing. Further, the modified internal race covers the damaged areas of the shaft on which the rescue bearing is mounted. Further, the modified internal race may be an oversized race that is necessary for the rescue bearing to overlap the damaged shaft surface. Further, the rescue bearing is installed with locking set screws and grease fittings. Further, the rescue bearing may be manufactured with specifications associated with the existing bearing. Further, the rescue bearing may be used with the existing specifications of the damaged shaft for an emergency repair without sizing the rescue bearing. Further, the rescue bearing may be mounted by removing a damaged bearing from the shaft, cleaning off small damage to the shaft, and installing the rescue rearing. Further, the rescue bearing covers the shaft damage and extend beyond the damaged area.

FIG. 1 is a front view of a rescue bearing 100 mounted on at least one shaft 102, in accordance with some embodiments. Further, the rescue bearing 100 may include an outer ring 104, an inner ring 106, a plurality of rolling elements 108, 110, and 112, and a pair of fastening elements 114, 116, 118, and 120.

Further, the outer ring 104 may include an outer peripheral surface 122, an inner peripheral surface, and a pair of opposing outer ring edges 124 and 126 defined by the outer peripheral surface 122 and the inner peripheral surface. Further, the outer ring 104 may include a hole defined by the inner peripheral surface. Further, the outer ring 104 may be an outer race.

Further, the inner ring 106 may include a middle portion 128 and a pair of opposing side portions 130 and 132. Further, the middle portion 128 may be concentrically disposed within the hole. Further, the inner peripheral surface of the outer ring 104 opposes an outer peripheral surface of the middle portion 128. Further, a first side portion 130 of the pair of opposing side portions 130 and 132 extends axially from a first side end 134 of the middle portion 128 beyond a first outer ring edge 124 of the pair of opposing outer ring edges 124 and 126. Further, a second side portion 132 of the pair of opposing side portions 130 and 132 extends axially from a second side end 136 of the middle portion 128 beyond a second outer ring edge 126 of the pair of opposing outer ring edges 124 and 126. Further, the first side end 134 opposes the second side end 136. Further, the inner ring 106 may include an inner peripheral surface and a bore defined by the inner peripheral surface. Further, the inner ring 106 may be configured for receiving the at least one shaft 102 into the bore based on inserting the at least one shaft 102 into the bore. Further, the inner ring 106 may be an extended inner race.

Further, the plurality of rolling elements 108, 110, and 112 may be rollably disposed between the inner ring 106 and the outer ring 104. Further, the inner ring 106 may be configured to rotate relative to the outer ring 104 using the plurality of rolling elements 108, 110, and 112. Further, the plurality of rolling elements 108, 110, and 112 may be a plurality of balls.

Further, the pair of fastening elements 114, 116, 118, and 120 may be coupled with the pair of opposing side portions 130 and 132. Further, the pair of opposing side portions 130 and 132 may be configured to be fastened to the at least one shaft 102 using the pair of fastening elements 114, 116, 118, and 120 based on the receiving of the at least one shaft 102 for securing the inner ring 106 to the at least one shaft 102.

Further, in some embodiments, the middle portion 128 overlaps a primary portion 138 of the at least one shaft 102 and the pair of opposing side portions 130 and 132 overlaps a pair of secondary portions 140 and 142 of the at least one shaft 102 based on the receiving. Further, the pair of opposing side portions 130 and 132 may be configured to be fastened to the pair of secondary portions 140 and 142 of the at least one shaft 102 using the pair of fastening elements 114, 116, 118, and 120 based on the receiving of the at least one shaft 102. Further, in an instance, the primary portion 138 may be a damaged portion of the at least one shaft 102. Further, the pair of secondary portions 140 and 142 may be an undamaged portion of the at least one shaft 102. Further, in an embodiment, the middle portion 128 may be not fastened to the primary portion 138 of the at least one shaft 102 based on the receiving of the at least one shaft 102. Further, in an embodiment, at least one of the first side portion 130 and the second side portion 132 may include at least one viewing portion. Further, at least a part of the at least one of the primary portion 138 and the pair of secondary portions 140 and 142 may be viewable through the at least one viewing portion based on the receiving. Further, the middle portion 128 may be alignable with the primary portion 138 and the pair of opposing side portions 130 and 132 may be alignable with the pair of secondary portions 140 and 142 based on the inserting of the at least one shaft 102 and viewing through the at least one viewing portion. Further, in an embodiment, the at least one viewing portion may include at least one opening disposed on an outer surface of the at least one of the first side portion 130 and the second side portion 132. Further, at least the part of the at least one of the primary portion 138 and the pair of secondary portions 140 and 142 may be viewable through the at least one opening. Further, in an embodiment, the at least one viewing portion may include at least one transparent material. Further, the at least one transparent material may include a transparent plastic, a transparent glass, etc. Further, at least the part of the at least one of the primary portion 138 and the pair of secondary portions 140 and 142 may be viewable through the at least one transparent material.

Figure 2:
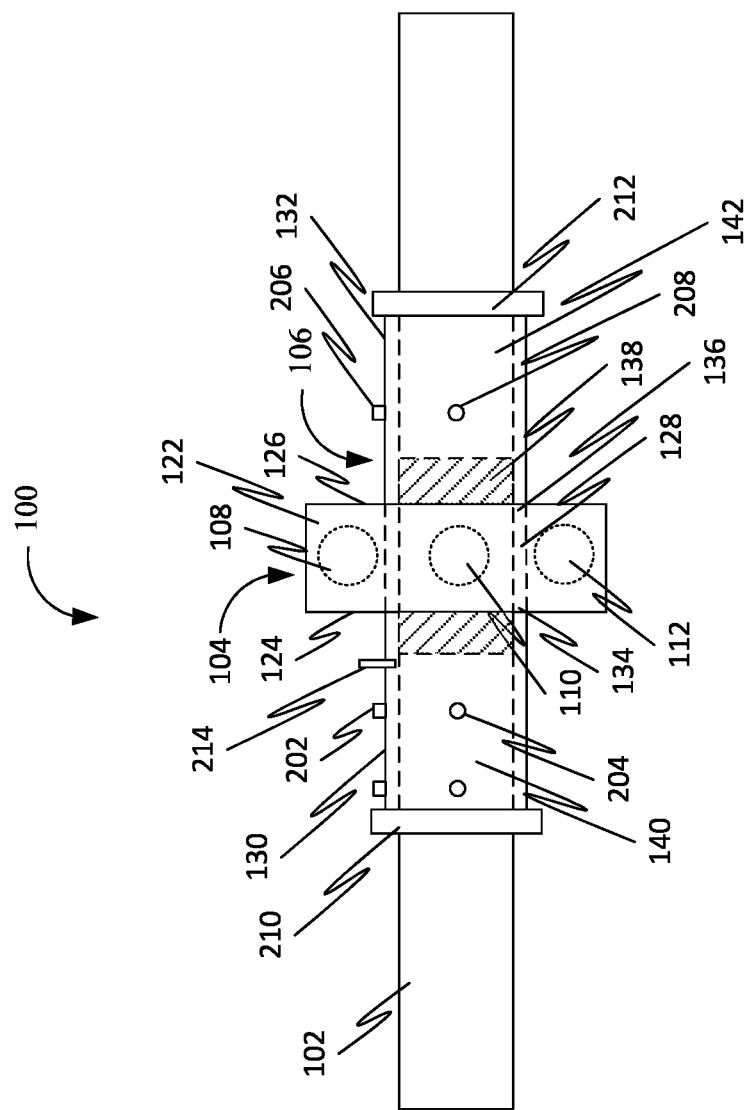
FIG. 2 is a front view of the rescue bearing mounted on the at least one shaft, in accordance with some embodiments.

In further embodiments, at least one surface profile detecting element 214, as shown in FIG. 2, may be coupled with the inner ring 106. Further, the at least one surface profile detecting element 214 may be configured for detecting at least one surface profile of the at least one shaft 102 based on the inserting of the at least one shaft 102. Further, the at least one surface profile may be defined by at least one of a presence and an absence of an indentation, a protrusion, etc. disposed on at least one surface of the at least one shaft 102. Further, the at least one surface profile corresponds to a texture of the at least one surface of the at least one shaft 102. Further, the texture may include a smooth texture and a rough texture. Further, the damaged portion may be associated with the rough texture and the undamaged portion may be associated with the smooth texture. Further, the detecting may include detecting the at least one of the presence and the absence of the indentation, the protrusion, etc. Further, the primary portion 138 may be associated with a first surface profile of the at least one surface profile and the pair of secondary portions 140 and 142 may be associated with a second surface profile of the at least one surface profile. Further, the first surface profile may be dissimilar from the second surface profile. Further, the middle portion 128 may be alignable with the primary portion 138 and the pair of opposing side portions 130 and 132 may be alignable with the pair of secondary portions 140 and 142 based on the inserting of the at least one shaft 102 and the detecting of the at least one surface profile. Further, in an embodiment, the at least one surface profile detecting element 214 may include at least one spring loaded pin. Further, the at least one spring loaded pin may be configured to press against at least one portion of the at least one shaft 102 based on the inserting of the at least one shaft 102. Further, the at least one spring loaded pin may be configured for moving in at least one moving pattern based on the at least one surface profile of the at least one portion. Further, the moving of the at least one spring loaded pin may be based on the interfacing of the at least one spring loaded pin with the indentation, the protrusion, etc. disposed on the at least one surface of the at least one portion of the at least one shaft 102. Further, the at least one portion may include the primary portion 138 and the pair of secondary portions 140 and 142. Further, the detecting of the at least one surface profile may be based on the moving of the at least one spring loaded pin in the at least one moving pattern.

Further, in some embodiments, the first side portion 130 may be configured to retractably extend between a plurality of positions in relation to the first side end 134 and the second side portion 132 may be configured to retractably extend between the plurality of positions in relation to the second side end 136. Further, each position of the plurality of positions corresponds to a length of each of the first side portion 130 and the second side portion 132.

Further, in some embodiments, the pair of fastening elements 114, 116, 118, and 120 may include a pair of locking set screws 202, 204, 206, and 208, as shown in FIG. 2, coupled with the pair of opposing side portions 130 and 132. Further, a locking set screw of the pair of locking set screws 202, 204, 206, and 208 may be threadedly coupled with an internally threaded opening comprised in each of the first side portion 130 and the second side portion 132. Further, the locking set screw may be configured for transitioning between a first position and a second position based on at least one action receivable by the locking set screw. Further, the pair of opposing side portions 130 and 132 detachably fastens to the at least one shaft 102 based on the transitioning of the pair of locking set screws 202, 204, 206, and 208 between the first position and the second position. Further, the pair of locking set screws 202, 204, 206, and 208 engages with the at least one shaft 102 based on the transitioning of the pair of locking set screws 202, 204, 206, and 208 from the first position to the second position in relation to the pair of opposing side portions 130 and 132. Further, the pair of locking set screws 202, 204, 206, and 208 disengages from the at least one shaft 102 based on the transitioning of the pair of locking set screws 202, 204, 206, and 208 from the second position to the first position in relation to the pair of opposing side portions 130 and 132. Further, the pair of opposing side portions 130 and 132 fastens to the at least one shaft 102 based on the transitioning from the first position to the second position. Further, the pair of opposing side portions 130 and 132 detaches from the at least one shaft 102 based on the transitioning from the second position to the first position.

Further, in some embodiments, the pair of fastening elements 114, 116, 118, and 120 may include a pair of concentric locking collars 210 and 212, as shown in FIG. 2, coupled with the pair of opposing side portions 130 and 132. Further, a concentric locking collar of the pair of concentric locking collars 210 and 212 may be disposed around an engageable portion comprised in each of the first side portion 130 and the second side portion 132. Further, the concentric locking collar may be configured for transitioning between a locked state and an unlocked state based on at least one action receivable by the concentric locking collar. Further, the pair of opposing side portions 130 and 132 detachably fastens to the at least one shaft 102 based on the transitioning of the pair of concentric locking collars 210 and 212 between the locked state and the unlocked state. Further, the pair of concentric locking collars 210 and 212 engages the engageable portion to the at least one shaft 102 in the locked state. Further, the pair of concentric locking collars 210 and 212 disengages the engageable portion from the at least one shaft 102 in the unlocked state. Further, the pair of opposing side portions 130 and 132 fastens to the at least one shaft 102 in the locked state. Further, the pair of opposing side portions 130 and 132 detaches from the at least one shaft 102 in the unlocked state.

Further, in some embodiments, the at least one shaft 102 may include a first shaft and a second shaft. Further, the inner ring 106 may be configured for receiving the first shaft and the second shaft into the bore based on the inserting of the first shaft into the bore from a first end of the bore and the second shaft into the bore from a second end of the bore. Further, the pair of opposing side portions 130 and 132 may be configured to be fastened to the first shaft and the second shaft using the pair of fastening elements 114, 116, 118, and 120 based on the receiving of the first shaft and the second shaft.

FIG. 2 is a front view of the rescue bearing 100 mounted on the at least one shaft 102, in accordance with some embodiments.

Figure 3:
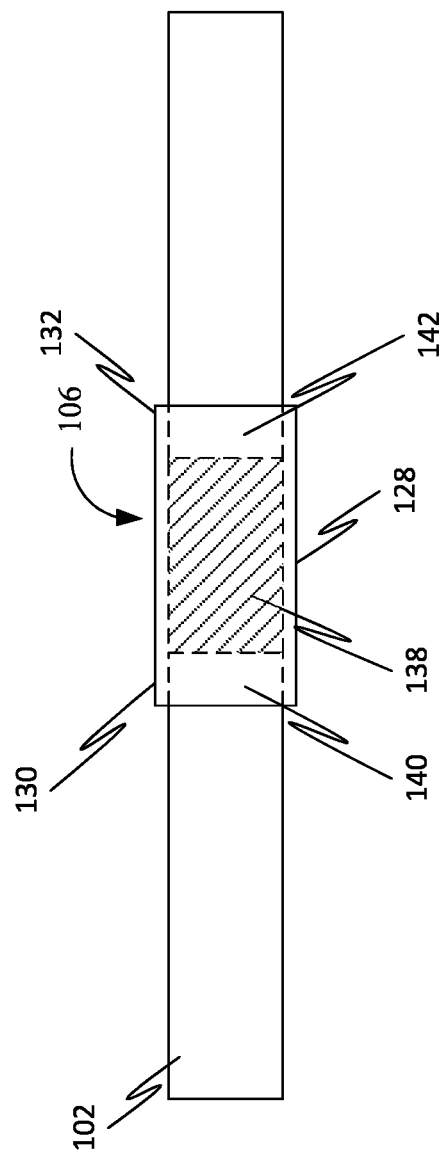
FIG. 3 is a front view of the inner ring mounted on the at least one shaft, in accordance with some embodiments.

FIG. 3 is a front view of the inner ring 106 mounted on the at least one shaft 102, in accordance with some embodiments. Further, the primary portion 138 of the at least one shaft 102 may be the damaged portion of the at least one shaft 102 and the pair of secondary portions 140 and 142 of the at least one shaft 102 may be the undamaged portion of the at least one shaft 102. Further, the at least one shaft 102 may be characterized by the at least one surface profile. Further, the at least one surface profile may be defined by the at least one of the presence and the absence of the indentation, the protrusion, etc. disposed on the at least one surface of the at least one shaft 102. Further, the at least one surface profile corresponds to the texture of the at least one surface of the at least one shaft 102. Further, the texture may be the smooth texture and the rough texture. Further, the damaged portion may include the rough texture and the undamaged portion may include the smooth texture. Further, the damaged portion may be characterized by a first length. Further, the inner ring 106 may be characterized by a second length. Further, the second length may be 1.5 times the first length. Further, the second length at 1.5 times the first length makes the bearing 100 a light-duty bearing.

Figure 4:
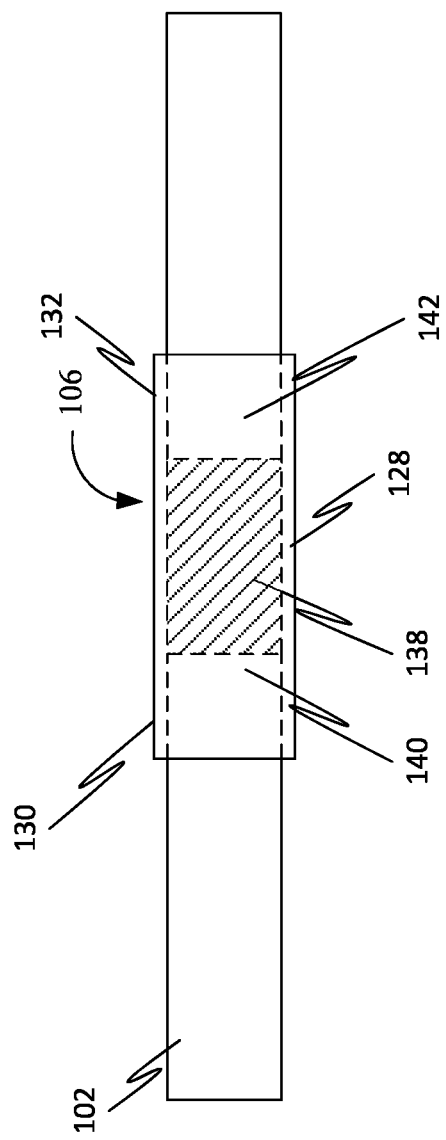
FIG. 4 is a front view of the inner ring mounted on the at least one shaft, in accordance with some embodiments.

FIG. 4 is a front view of the inner ring 106 mounted on the at least one shaft 102, in accordance with some embodiments. Further, the damaged portion may be characterized by the first length. Further, the inner ring 106 may be characterized by the second length. Further, the second length may be 2 times the first length. Further, the second length at 2 times the first length makes the bearing 100 a medium-duty bearing.

Figure 5:
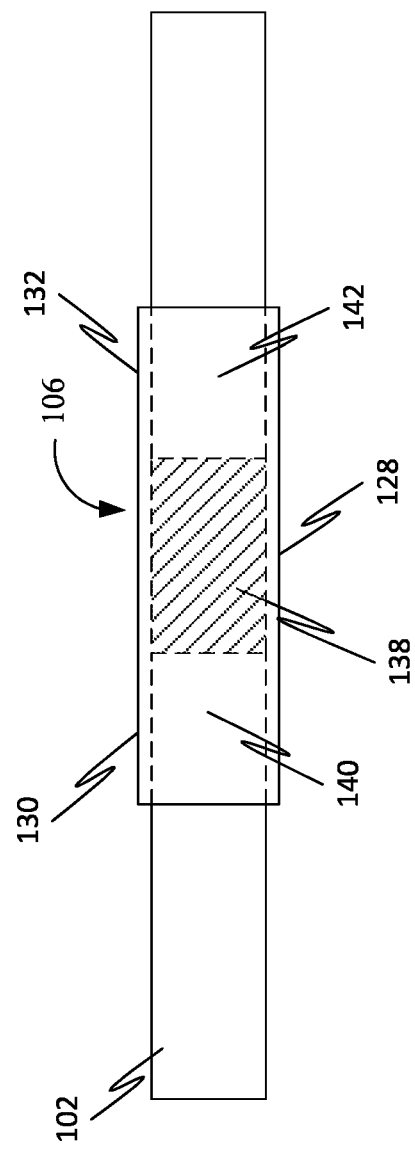
FIG. 5 is a front view of the inner ring mounted on the at least one shaft, in accordance with some embodiments.

FIG. 5 is a front view of the inner ring 106 mounted on the at least one shaft 102, in accordance with some embodiments. Further, the damaged portion may be characterized by the first length. Further, the inner ring 106 may be characterized by the second length. Further, the second length may be 2.5 times the first length. Further, the second length at 2.5 times the first length makes the bearing 100 a heavy-duty bearing.

Figure 6:
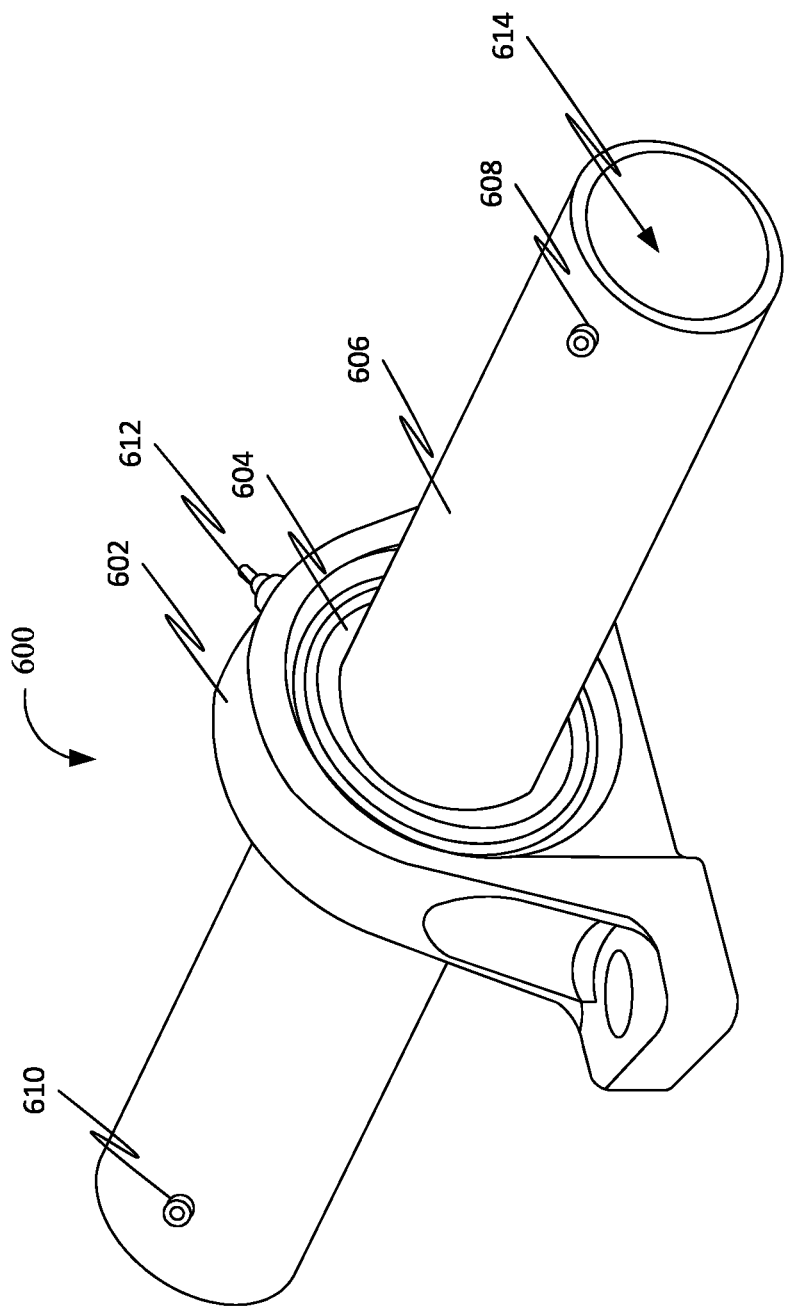
FIG. 6 is a perspective view of a rescue bearing, in accordance with some embodiments.

FIG. 6 is a perspective view of a rescue bearing 600, in accordance with some embodiments. Further, the rescue bearing 600 may include a housing 602, an outer ring 604, an inner ring 606, a plurality of rolling elements (not shown), and a pair of fastening elements 608 and 610.

Further, the housing 602 may include at least one grease fitting 612 disposed on the housing 602.

Further, the outer ring 604 may be disposed within the housing 602. Further, the outer ring 604 may include an outer peripheral surface, an inner peripheral surface, and a pair of opposing outer ring edges defined by the outer peripheral surface and the inner peripheral surface. Further, the outer ring 604 may include a hole defined by the inner peripheral surface. Further, the outer ring 604 may be an outer race.

Further, the inner ring 606 may include a middle portion and a pair of opposing side portions. Further, the middle portion may be concentrically disposed within the hole. Further, the inner peripheral surface of the outer ring 604 opposes an outer peripheral surface of the middle portion. Further, a first side portion of the pair of opposing side portions extends axially from a first side end of the middle portion beyond a first outer ring edge of the pair of opposing outer ring edges. Further, a second side portion of the pair of opposing side portions extends axially from a second side end of the middle portion beyond a second outer ring edge of the pair of opposing outer ring edges. Further, the first side end opposes the second side end. Further, the inner ring 606 may include an inner peripheral surface and a bore 614 defined by the inner peripheral surface. Further, the inner ring 606 may be configured for receiving at least one shaft into the bore 614 based on inserting the at least one shaft into the bore 614. Further, the inner ring 606 may be an extended inner race.

Further, the plurality of rolling elements may be rollably disposed between the inner ring 606 and the outer ring 604. Further, the inner ring 606 may be configured to rotate relative to the outer ring 604 using the plurality of rolling elements.

Further, the pair of fastening elements 608 and 610 may be coupled with the pair of opposing side portions. Further, the pair of opposing side portions may be configured to be fastened to the at least one shaft using the pair of fastening elements 608 and 610 based on the receiving of the at least one shaft for securing the inner ring 606 to the at least one shaft. Further, the pair of fastening elements 608 and 610 may include a pair of locking set screws.

Figure 7:
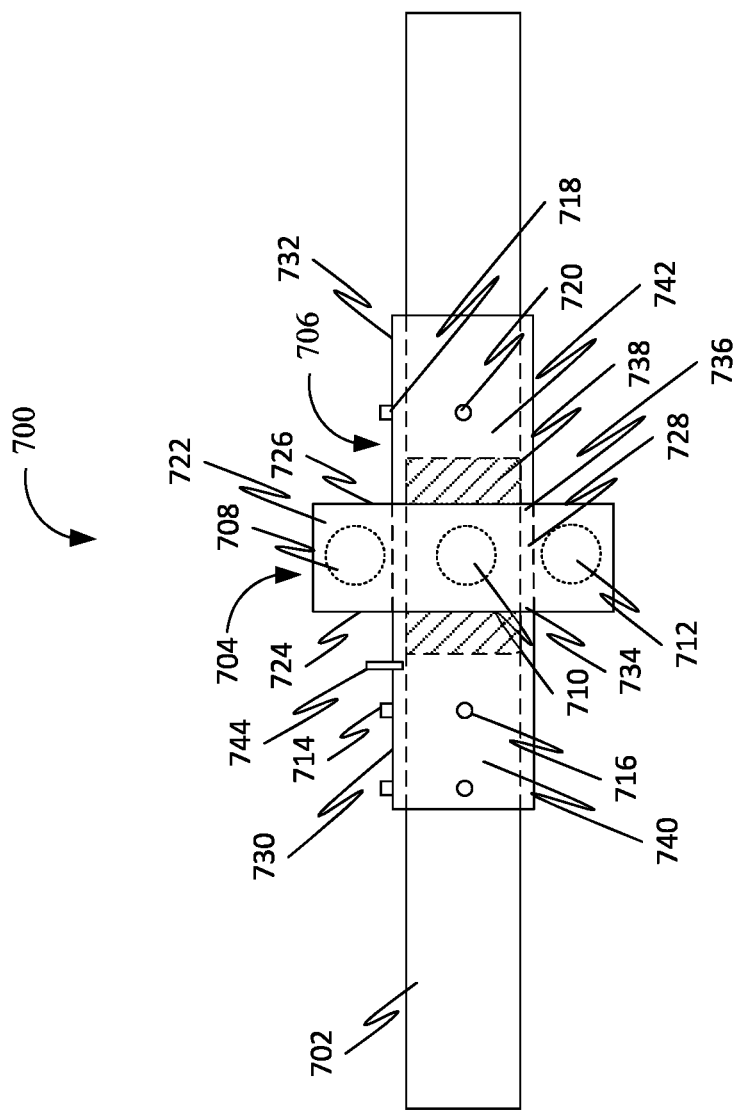
FIG. 7 is a front view of a rescue bearing mounted on at least one shaft, in accordance with some embodiments.

FIG. 7 is a front view of a rescue bearing 700 mounted on at least one shaft 702, in accordance with some embodiments. Further, the rescue bearing 700 may include an outer ring 704, an inner ring 706, a plurality of rolling elements 708, 710, and 712, a pair of fastening elements 714, 716, 718, and 720, and at least one surface profile detecting element 744.

Further, the outer ring 704 may include an outer peripheral surface 722, an inner peripheral surface, and a pair of opposing outer ring edges 724 and 726 defined by the outer peripheral surface 722 and the inner peripheral surface. Further, the outer ring 704 may include a hole defined by the inner peripheral surface.

Further, the inner ring 706 may include a middle portion 728 and a pair of opposing side portions 730 and 732. Further, the middle portion 728 may be concentrically disposed within the hole. Further, the inner peripheral surface of the outer ring 704 opposes an outer peripheral surface of the middle portion 728. Further, a first side portion 730 of the pair of opposing side portions 730 and 732 extends axially from a first side end 734 of the middle portion 728 beyond a first outer ring edge 724 of the pair of opposing outer ring edges 724 and 726. Further, a second side portion 732 of the pair of opposing side portions 730 and 732 extends axially from a second side end 736 of the middle portion 728 beyond a second outer ring edge 726 of the pair of opposing outer ring edges 724 and 726. Further, the first side end 734 opposes the second side end 736. Further, the inner ring 706 may include an inner peripheral surface and a bore defined by the inner peripheral surface. Further, the inner ring 706 may be configured for receiving the at least one shaft 702 into the bore based on inserting the at least one shaft 702 into the bore.

Further, the plurality of rolling elements 708, 710, and 712 may be rollably disposed between the inner ring 706 and the outer ring 704. Further, the inner ring 706 may be configured to rotate relative to the outer ring 704 using the plurality of rolling elements 708, 710, and 712.

Further, the pair of fastening elements 714, 716, 718, and 720 may be coupled with the pair of opposing side portions 730 and 732. Further, the pair of opposing side portions 730 and 732 may be configured to be fastened to the at least one shaft 702 using the pair of fastening elements 714, 716, 718, and 720 based on the receiving of the at least one shaft 702 for securing the inner ring 706 to the at least one shaft 702. Further, the middle portion 728 overlaps a primary portion 738 of the at least one shaft 702 and the pair of opposing side portions 730 and 732 overlaps a pair of secondary portions 740 and 742 of the at least one shaft 702 based on the receiving. Further, the pair of opposing side portions 730 and 732 may be configured to be fastened to the pair of secondary portions 740 and 742 of the at least one shaft 702 using the pair of fastening elements 714, 716, 718, and 720 based on the receiving of the at least one shaft 702.

Further, the at least one surface profile detecting element 744 may be coupled with the inner ring 706. Further, the at least one surface profile detecting element 744 may be configured for detecting at least one surface profile of the at least one shaft 702 based on the inserting of the at least one shaft 702. Further, the primary portion 738 may be associated with a first surface profile of the at least one surface profile and the pair of secondary portions 740 and 742 may be associated with a second surface profile of the at least one surface profile. Further, the first surface profile may be dissimilar from the second surface profile. Further, the middle portion 728 may be alignable with the primary portion 738 and the pair of opposing side portions 730 and 732 may be alignable with the pair of secondary portions 740 and 742 based on the inserting of the at least one shaft 702 and the detecting of the at least one surface profile.

Further, in some embodiments, the at least one surface profile detecting element 744 may include at least one spring loaded pin. Further, the at least one spring loaded pin may be configured to press against at least one portion of the at least one shaft 702 based on the inserting of the at least one shaft 702. Further, the at least one spring loaded pin may be configured for moving in at least one moving pattern based on the at least one surface profile of the at least one portion. Further, the at least one portion may include the primary portion 738 and the pair of secondary portions 740 and 742. Further, the detecting of the at least one surface profile may be based on the moving of the at least one spring loaded pin in the at least one moving pattern.

Further, in some embodiments, the middle portion 728 may be not fastened to the primary portion 738 of the at least one shaft 702 based on the receiving of the at least one shaft 702.

Further, in some embodiments, at least one of the first side portion 730 and the second side portion 732 may include at least one viewing portion. Further, at least a part of the at least one of the primary portion 738 and the pair of secondary portions 740 and 742 may be viewable through the at least one viewing portion based on the receiving. Further, the middle portion 728 may be alignable with the primary portion 738 and the pair of opposing side portions 730 and 732 may be alignable with the pair of secondary portions 740 and 742 based on the inserting of the at least one shaft 702 and viewing through the at least one viewing portion.

Further, in some embodiments, the pair of fastening elements 714, 716, 718, and 720 may include a pair of locking set screws coupled with the pair of opposing side portions 730 and 732. Further, a locking set screw of the pair of locking set screws may be threadedly coupled with an internally threaded opening comprised in each of the first side portion 730 and the second side portion 732. Further, the locking set screw may be configured for transitioning between a first position and a second position based on at least one action receivable by the locking set screw. Further, the pair of opposing side portions 730 and 732 detachably fastens to the at least one shaft 702 based on the transitioning of the pair of locking set screws between the first position and the second position.

Further, in some embodiments, the pair of fastening elements 714, 716, 718, and 720 may include a pair of concentric locking collars coupled with the pair of opposing side portions 730 and 732. Further, a concentric locking collar of the pair of concentric locking collars may be disposed around an engageable portion comprised in each of the first side portion 730 and the second side portion 732. Further, the concentric locking collar may be configured for transitioning between a locked state and an unlocked state based on at least one action receivable by the concentric locking collar. Further, the pair of opposing side portions 730 and 732 detachably fastens to the at least one shaft 702 based on the transitioning of the pair of concentric locking collars between the locked state and the unlocked state.

Further, in some embodiments, the at least one shaft 702 may include a first shaft and a second shaft. Further, the inner ring 706 may be configured for receiving the first shaft and the second shaft into the bore based on the inserting of the first shaft into the bore from a first end of the bore and the second shaft into the bore from a second end of the bore. Further, the pair of opposing side portions 730 and 732 may be configured to be fastened to the first shaft and the second shaft using the pair of fastening elements 714, 716, 718, and 720 based on the receiving of the first shaft and the second shaft.

Figure 8:
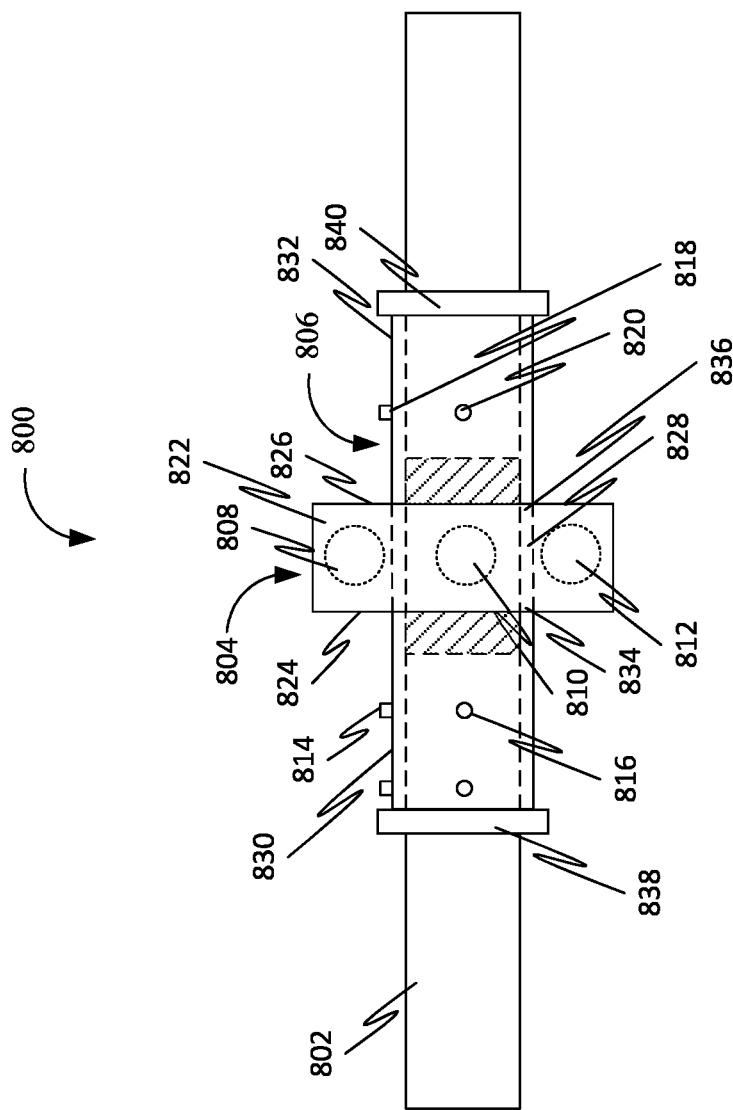
FIG. 8 is a front view of a rescue bearing mounted on at least one shaft, in accordance with some embodiments.

FIG. 8 is a front view of a rescue bearing 800 mounted on at least one shaft 802, in accordance with some embodiments. Further, the rescue bearing 800 may include an outer ring 804, an inner ring 806, a plurality of rolling elements 808, 810, and 812, a pair of locking set screws 814, 816, 818, and 820, and a pair of concentric locking collars 838 and 840.

Further, the outer ring 804 may include an outer peripheral surface 822, an inner peripheral surface, and a pair of opposing outer ring edges 824 and 826 defined by the outer peripheral surface 822 and the inner peripheral surface. Further, the outer ring 804 may include a hole defined by the inner peripheral surface.

Further, the inner ring 806 may include a middle portion 828 and a pair of opposing side portions 830 and 832. Further, the middle portion 828 may be concentrically disposed within the hole. Further, the inner peripheral surface of the outer ring 804 opposes an outer peripheral surface of the middle portion 828. Further, a first side portion 830 of the pair of opposing side portions 830 and 832 extends axially from a first side end 834 of the middle portion 828 beyond a first outer ring edge 824 of the pair of opposing outer ring edges 824 and 826. Further, a second side portion 832 of the pair of opposing side portions 830 and 832 extends axially from a second side end 836 of the middle portion 828 beyond a second outer ring edge 826 of the pair of opposing outer ring edges 824 and 826. Further, the first side end 834 opposes the second side end 836. Further, the inner ring 806 may include an inner peripheral surface and a bore defined by the inner peripheral surface. Further, the inner ring 806 may be configured for receiving the at least one shaft 802 into the bore based on inserting the at least one shaft 802 into the bore.

Further, the plurality of rolling elements 808, 810, and 812 may be rollably disposed between the inner ring 806 and the outer ring 804. Further, the inner ring 806 may be configured to rotate relative to the outer ring 804 using the plurality of rolling elements 808, 810, and 812.

Further, the pair of locking set screws 814, 816, 818, and 820 may be coupled with the pair of opposing side portions 830 and 832. Further, a locking set screw of the pair of locking set screws 814, 816, 818, and 820 may be threadedly coupled with an internally threaded opening comprised in each of the first side portion 830 and the second side portion 832. Further, the locking set screw may be configured for transitioning between a first position and a second position based on at least one action receivable by the locking set screw. Further, the pair of opposing side portions 830 and 832 detachably fastens to the at least one shaft 802 based on the transitioning of the pair of locking set screws 814, 816, 818, and 820 between the first position and the second position.

Further, the pair of concentric locking collars 838 and 840 may be coupled with the pair of opposing side portions 830 and 832. Further, a concentric locking collar of the pair of concentric locking collars 838 and 840 may be disposed around an engageable portion comprised in the each of the first side portion 830 and the second side portion 832. Further, the concentric locking collar may be configured for transitioning between a locked state and an unlocked state based on at least one action receivable by the concentric locking collar. Further, the pair of opposing side portions 830 and 832 detachably fastens to the at least one shaft 802 based on the transitioning of the pair of concentric locking collars 838 and 840 between the locked state and the unlocked state.

Although the present disclosure has been explained in relation to its preferred embodiment, it is to be understood that many other possible modifications and variations can be made without departing from the spirit and scope of the disclosure.

What is claimed is:

1. A rescue bearing comprising:
    an outer ring comprising an outer peripheral surface, an inner peripheral surface, and a pair of opposing outer ring edges defined by the outer peripheral surface and the inner peripheral surface, wherein the outer ring comprises a hole defined by the inner peripheral surface;
    an inner ring comprising a middle portion and a pair of opposing side portions, wherein the middle portion is concentrically disposed within the hole, wherein the inner peripheral surface of the outer ring opposes an outer peripheral surface of the middle portion, wherein a first side portion of the pair of opposing side portions extends axially from a first side end of the middle portion beyond a first outer ring edge of the pair of opposing outer ring edges, wherein a second side portion of the pair of opposing side portions extends axially from a second side end of the middle portion beyond a second outer ring edge of the pair of opposing outer ring edges, wherein the first side end opposes the second side end, wherein the inner ring comprises an inner peripheral surface and a bore defined by the inner peripheral surface, wherein the inner ring is configured for receiving at least one shaft into the bore;
    wherein the middle portion overlaps a primary portion of the at least one shaft and the pair of opposing side portions overlaps a pair of secondary portions of the at least one shaft when the at least one shaft is inserted into the bore;
    a pair of fastening elements coupled with the pair of opposing side portions, wherein the pair of opposing side portions are configured to be fastened to the at least one shaft using the pair of fastening elements when the at least one shaft is inserted into the bore for securing the inner ring to the at least one shaft;
    a plurality of rolling elements rollably disposed between the inner ring and the outer ring, wherein the inner ring is configured to rotate relative to the outer ring using the plurality of rolling elements; and
    at least one surface profile detecting element coupled with the inner ring, wherein the at least one surface profile detecting element is configured for detecting at least one surface profile of the at least one shaft when the at least one shaft is inserted into the bore, wherein the primary portion includes a first surface profile of the at least one surface profile and the pair of secondary portions includes a second surface profile of the at least one surface profile, wherein the first surface profile is dissimilar from the second surface profile, wherein the middle portion is alignable with the primary portion and the pair of opposing side portions is alignable with the pair of secondary portions when the at least one shaft is inserted into the bore and the at least one surface profile is detected.

2. The bearing of claim 1, wherein the at least one surface profile detecting element comprises at least one spring loaded pin, wherein the at least one spring loaded pin is configured to press the primary portion and the pair of secondary portions of the at least one shaft when the at least one shaft is inserted into the bore, wherein the at least one spring loaded pin is configured for moving in at least one moving pattern in response to the at least one surface profile of the at least one portion, wherein the detecting of the at least one surface profile is accomplished by the moving of the at least one spring loaded pin in the at least one moving pattern.

3. The bearing of claim 1, wherein the pair of fastening elements comprises a pair of locking set screws coupled with the pair of opposing side portions, wherein each locking set screw of the pair of locking set screws is threadedly coupled with an internally threaded opening in one of the first side portion and the second side portion, wherein the locking set screw is configured for transitioning between a first position and a second position based on at least one action receivable by the locking set screw, wherein the pair of opposing side portions detachably fastens to the at least one shaft based on the transitioning of the pair of locking set screws between the first position and the second position.

4. The bearing of claim 1, wherein the pair of fastening elements comprises a pair of concentric locking collars coupled with the pair of opposing side portions, wherein each concentric locking collar of the pair of concentric locking collars is disposed around an engageable portion on one of the first side portion and the second side portion, wherein the concentric locking collar is configured for transitioning between a locked state and an unlocked state based on at least one action receivable by the concentric locking collar, wherein the pair of opposing side portions detachably fastens to the at least one shaft based on the transitioning of the pair of concentric locking collars between the locked state and the unlocked state.

\* \* \* \* \*